Feb. 4, 1958 W. E. PERKINS ET AL 2,821,735
WINDSHIELD WIPER
Filed Dec. 24, 1953
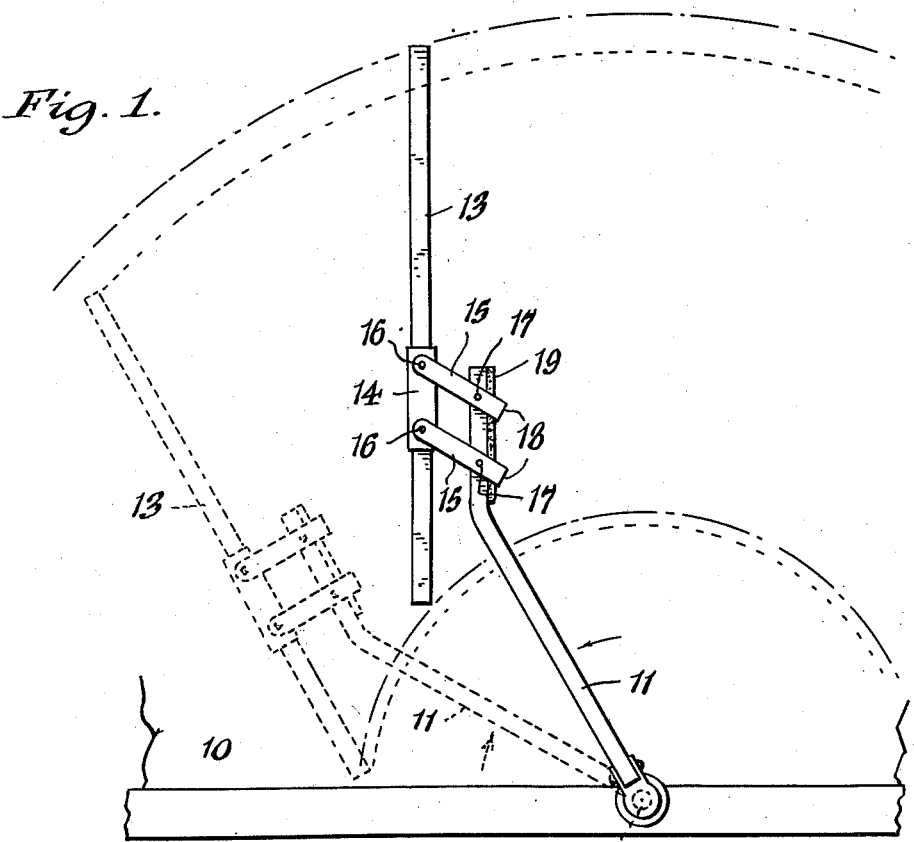
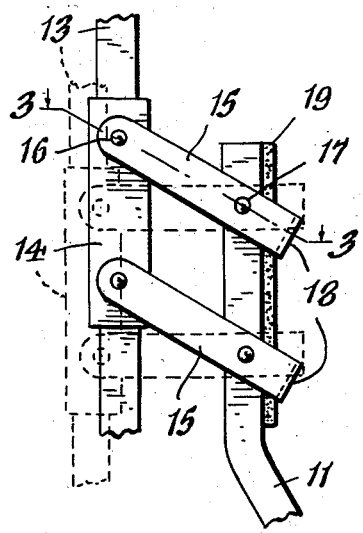
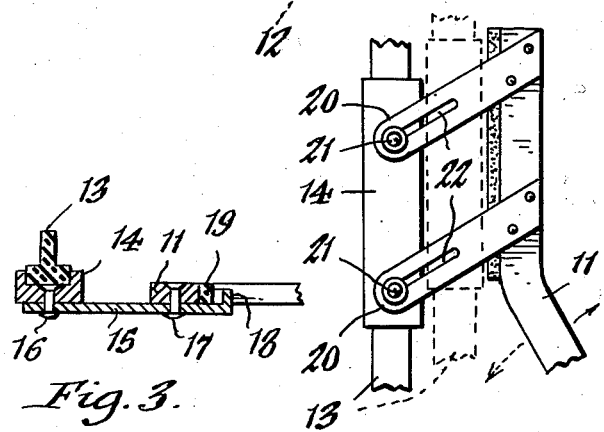
INVENTORS
Warren E. Perkins
Albert G. Perkins
By Walter P. Guyer
ATTORNEY United States Patent Office 2,821,735
Patented Feb. 4, 1958

2,821,735

WINDSHIELD WIPER

Warren E. Perkins and Albert G. Perkins,
Grand Island, N. Y.

Application December 24, 1953, Serial No. 400,320

3 Claims. (Cl. 15—255)

This invention relates to certain new and useful improvements in automotive windshield wipers.

It has for one of its primary objects to provide a windshield wiper which is so designed and constructed as to effect a relative displacement of the wiper blade to its carrier or actuating arm so that when moved in one direction the wiper blade will travel over a given area of the windshield and when moved in the opposite direction it will travel over a somewhat extended and partially overlapped area to that of the companion wiper stroke.

Another object of the invention is to provide a wiper of this character wherein the wiper blade is so suspended from the actuating arm as to automatically cause its endwise displacement relative thereto in one direction or the other adjacent the ends of the fore and aft strokes of the wiper over the windshield.

A further object is to provide a windshield wiper which is not only simple, compact and inexpensive in construction but which will also effect a maximum cleaning of the windshield and eliminate the formation of undesirable streaks thereon.

Other features of the invention reside in the construction and arrangement of parts hereinafter described and particularly pointed out in the appended claims.

In the accompanying drawings:

Figure 1 is a fragmentary front view of an automobile windshield showing my improved wiper in operative relation thereto.

Figure 2 is an enlarged fragmentary front elevation showing the mounting of the wiper blade on the driving or actuating arm of the windshield wiper.

Figure 3 is a cross section taken on line 3—3, Figure 2.

Figure 4 is a fragmentary front view of a modified form of the invention.

Similar characters of reference indicate corresponding parts throughout the several views.

Referring now to the drawings, 10 indicates a vehicle windshield and 11 the driving or actuating arm of a windshield wiper of any well known construction, such arm being pivoted at 12 to oscillate over the windshield in a substantially semi-circular path. Mounted on the outer end of this driving arm at one side thereof for movement therewith in surface contact with the windshield is a wiper blade 13 of rubber or like material having a fitting 14 applied thereto substantially centrally thereof.

The wiper blade 13 is so connected to the driving arm 11 as to be capable of endwise displacement relative thereto, at predetermined times, in a substantially radial in and out direction so that when moving in one direction it cleans an arcuate area of a given radius and when moving in the opposite or reverse direction it travels over a different arcuate area partially overlapped or staggered relatively to that area covered on the initial or companion stroke. To this end, the blade-fitting 14 is preferably joined to or suspended from the actuating arm by a floating or toggle connection composed of parallel links 15, 15, each pivoted at one end, as indicated at 16, to such fitting, and adjacent the other end to the arm 11, as indicated at 17, whereby the wiper blade is free to shift, during the normal back and forth wiper stroke action and at the leading ends of such strokes, toward and from the opposing side of the actuating arm and in so doing is simultaneously displaced in an in and out endwise or radial direction. The arm-attaching ends of the links are extended outwardly somewhat and terminate in laterally-bent flanges 18 which are adapted to abut against a rubber pad 19 applied to the adjoining face of the actuating arm to cushion and limit the displacement of the blade in a direction toward the arm.

In operation, as the actuating arm 11 travels in a counter-clockwise direction over the windshield, viewing Figure 1, the wiper blade is automatically caused to be relatively displaced by the links 15 in a direction toward such arm and simultaneously to its outer or endwise-extended position to move across the windshield over an arc of a given radius. When the direction of the actuating arm is reversed, the wiper blade is then automatically caused to be link-displaced in a reversed direction away from such arm and simultaneously to its inner, endwise-extended position to move across the windshield along a different or partially overlapping and inwardly extended arc from that traveled on the counter-clockwise stroke. This results in a more complete cleaning of the windshield because of the overlapping action produced and it also effectually eliminates because of the radial in and out movement of the blade, the formation of objectionable streaks sometimes formed on the windshield because of the worn condition of the wiper blade.

In the modified form of the invention shown in Figure 4, the connection between the actuating arm 11 and the wiper blade 13 consists of parallel tie bars or links 20 inclined to the horizontal and fixed at one end to the arm and having a pin and slot connection 21, 22 to the fitting 14 of the wiper blade whereby the latter is caused to shift endwise in and out at the start of the clockwise and counter-clockwise strokes of the actuating arm.

From the foregoing it will be seen that the wiper embodying the present invention has a swinging arm member 11, a wiper blade member 13 and means, such as the pair of links 15 or the slots 22 in the connecting means 20, which constrain the blade member 13 to move in one path (dotted lines, Fig. 1) when the arm member 11 is swung in one direction and to move in another path (dot-dash lines, Fig. 1) when the arm member is swung in the opposite direction. It will also be seen that the constraining means moves the blade member to a position remote from the axis of the arm member 11 when the latter is swung in one direction and to a position closer to this axis when the arm member swings in the opposite direction and that these members are preferably arranged generally parallel and one in advance of the other. Also, the movement of the blade member relative to the arm member is a function of the frictional resistance of the surface being cleaned to the movement of the blade member, and stops, such as the flanges 18 or the ends of the slots 22, limit the movement of the arm and blade member relative to each other.

We claim as our invention:

1. In a windshield wiper, a swinging arm member, means pivotally supporting said arm member to swing about a fixed axis, a wiper blade member arranged generally parallel with said arm member, one of said members being arranged in advance of the other, a pair of links pivotally connecting said wiper blade member and arm member to swing in a direction lengthwise of said members whereby said wiper blade member is constrained to move lengthwise of said arm member to one position each time said arm member is swung in one direction and to move lengthwise of said arm member to another position each time said arm member is swung in the opposite direction, and stop means limiting the longitudinal movement of said arm and wiper blade member longitudinally with respect to each other.

2. The combination set forth in claim 1 wherein said stop means are interposed between at least one of said links and said arm member.

3. The combination set forth in claim 1 wherein said stop means are resilient to provide a cushioned action.

References Cited in the file of this patent

UNITED STATES PATENTS

| | | |
|---|---|---|
| 1,515,584 | Hansen | Nov. 11, 1924 |
| 1,660,971 | Linder | Feb. 28, 1928 |
| 1,727,456 | Uddenborg | Sept. 10, 1929 |
| 2,491,697 | Vischulis | Dec. 20, 1949 |

FOREIGN PATENTS

| | | |
|---|---|---|
| 645,789 | Germany | Dec. 25, 1935 |